US007088094B2

(12) United States Patent
VunKannon, Jr.

(10) Patent No.: US 7,088,094 B2
(45) Date of Patent: Aug. 8, 2006

(54) DISPLACEMENT SENSING SYSTEM AND METHOD

(75) Inventor: Robert S VunKannon, Jr., Burbank, WA (US)

(73) Assignee: Infinia Corporation, Kennewick, WA (US)

( * ) Notice: Subject to any disclaimer, the term of this patent is extended or adjusted under 35 U.S.C. 154(b) by 38 days.

(21) Appl. No.: 10/895,019

(22) Filed: Jul. 20, 2004

(65) Prior Publication Data

US 2006/0017432 A1    Jan. 26, 2006

(51) Int. Cl.
*G01B 7/14* (2006.01)
*H01F 5/02* (2006.01)

(52) U.S. Cl. .............................. 324/207.17; 324/207.24

(58) Field of Classification Search ........... 324/207.24, 324/207.26, 207.15–207.19
See application file for complete search history.

(56) References Cited

U.S. PATENT DOCUMENTS

| | | | | |
|---|---|---|---|---|
| 4,591,795 A | * | 5/1986 | McCorkle | 327/104 |
| 4,783,626 A | * | 11/1988 | Shimizu | 324/207.18 |
| 4,937,523 A | * | 6/1990 | Duverger et al. | 324/207.18 |
| 4,982,156 A | * | 1/1991 | Lewis et al. | 324/207.18 |
| 5,264,733 A | * | 11/1993 | Tigges | 307/116 |
| 5,764,053 A | * | 6/1998 | Robbins et al. | 324/226 |
| 6,208,134 B1 | * | 3/2001 | Demma | 324/207.26 |
| 6,400,140 B1 | * | 6/2002 | Lee | 324/207.18 |
| 6,605,940 B1 | * | 8/2003 | Tabrizi et al. | 324/207.18 |
| 6,803,757 B1 | * | 10/2004 | Slates | 324/207.17 |

FOREIGN PATENT DOCUMENTS

DE     10052152 C1 *  9/2001

* cited by examiner

*Primary Examiner*—Edward Lefkowitz
*Assistant Examiner*—Kenneth J. Whittington
(74) *Attorney, Agent, or Firm*—Brian L. Johnson; Davis Wright Tremaine LLP

(57) ABSTRACT

A displacement sensing system and method addresses demanding requirements for high precision sensing of displacement of a shaft, for use typically in a linear electrodynamic machine, having low failure rates over multi-year unattended operation in hostile environments. Applications include outer space travel by spacecraft having high-temperature, sealed environments without opportunity for servicing over many years of operation. The displacement sensing system uses a three coil sensor configuration, including a reference and sense coils, to provide a pair of ratio-metric signals, which are inputted into a synchronous comparison circuit, which is synchronously processed for a resultant displacement determination. The pair of ratio-metric signals are similarly affected by environmental conditions so that the comparison circuit is able to subtract or nullify environmental conditions that would otherwise cause changes in accuracy to occur.

13 Claims, 4 Drawing Sheets

DISPLACEMENT SENSING SYSTEM AND METHOD

GOVERNMENT LICENSE RIGHTS

The U.S. Government has a paid-up license in this invention and the right in limited circumstances to require the patent owner to license others on reasonable terms as provided for by the terms of contract No. DE-AC03-02SF22491 awarded by the United States Department of Energy.

BACKGROUND OF THE INVENTION

1. Field of the Invention

The present invention is directed generally to systems that sense when displacement occurs and, more particularly, to a displacement sensor for long term unattended operation under demanding environmental conditions.

2. Description of the Related Art

Linear electro-dynamic machines convert linear motion of a shaft into electrical power and are used for and have further potential for demanding applications such as unattended operation of space craft power systems, other remote systems in hostile environments, and other implementations including linear coolers and linear drives. During operation, certain displacement information regarding the shaft is necessary. Unfortunately, conventional methods for sensing displacement have not been able to meet requirements raised such as for high precision sensing having low failure rates over multi-year unattended operation in hostile environments. Furthermore, imprecise displacement sensing can adversely affect related and other systems including Stirling Engine systems, down-hole oil pumps, and free-piston engines in general.

BRIEF SUMMARY OF THE INVENTION

The present invention resides in a displacement system and method with a shaft having magnetic permeability greater that of a medium, which at least surrounds a portion of the shaft. The shaft is configured for bi-directional linear travel along a first axis. Included is a drive signal generator including an oscillator configured to generate a drive signal having a periodically varying parameter and a drive coil having turns of wire, the drive coil electrically coupled to the drive signal generator to be energized by the drive signal generator to produce a time varying magnetic flux. Included is a reference coil having turns of wire, the reference coil being in proximity of the drive coil for a first parameter to be induced in the reference coil by the magnetic flux.

Included is a sense coil having turns of wire having a longitudinal axis in line with the first axis such that at least a portion of the shaft passes into the sense coil to magnetically engage the sense coil during a least a portion of the bidirectional linear travel of the shaft, the sense coil being in proximity of the drive coil for a second parameter to be induced in the sense coil by the magnetic flux, the amplitude of the second parameter being influenced by how far the shaft has advanced into the sense coil, the ratio of magnitude of the second parameter to the first parameter being known for at least one position of advancement by the shaft into the sense coil during the bi-directional linear travel of the shaft. Also, included is a signal processor configured to compare the first parameter to the second parameter to identify when the shaft is at the at least one position of advancement.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

As will be discussed in greater detail herein, a displacement sensing system and method addresses demanding requirements for high precision sensing of displacement of a shaft, for use typically in a linear electro-dynamic machine, having low failure rates over multi-year unattended operation in hostile environments. Applications include outer space travel by spacecraft having high-temperature, sealed environments without opportunity for servicing over many years of operation, and other environments not necessarily remote or having high temperature and other implementations such as involving linear coolers and linear drives.

Conventional systems have not been able to meet the challenge of unattended long term precision displacement sensing (such as within 0.002 inches) in hostile environments. Optical sensors have not been able to tolerate high temperatures (over 100 C) for long periods. Also, magnetic sensors, such as Hall Effect sensors, have been unable to provide sufficient accuracy. Further, conventional coil type sensors have failed to maintain their accuracy over changes in environmental temperature, which is a common occurrence with hostile environments such as with spacecraft traversing outer space and with other implementations.

The displacement sensing system and method described herein uses a three coil sensor configuration, including a reference coil, to provide a pair of ratio-metric signals, which are inputted into a synchronous comparison circuit for a resultant displacement determination. The pair of ratio-metric signals are similarly affected by environmental conditions so that the synchronous comparison circuit is able to subtract or nullify environmental conditions that would otherwise cause changes in accuracy to occur. The displacement sensing system and method also can typically handle very high temperatures and ambient pressures such as those exceeding 500 psia. Implementations can even be used in hot, nonconductive, non-corrosive fluids.

Figure 1:
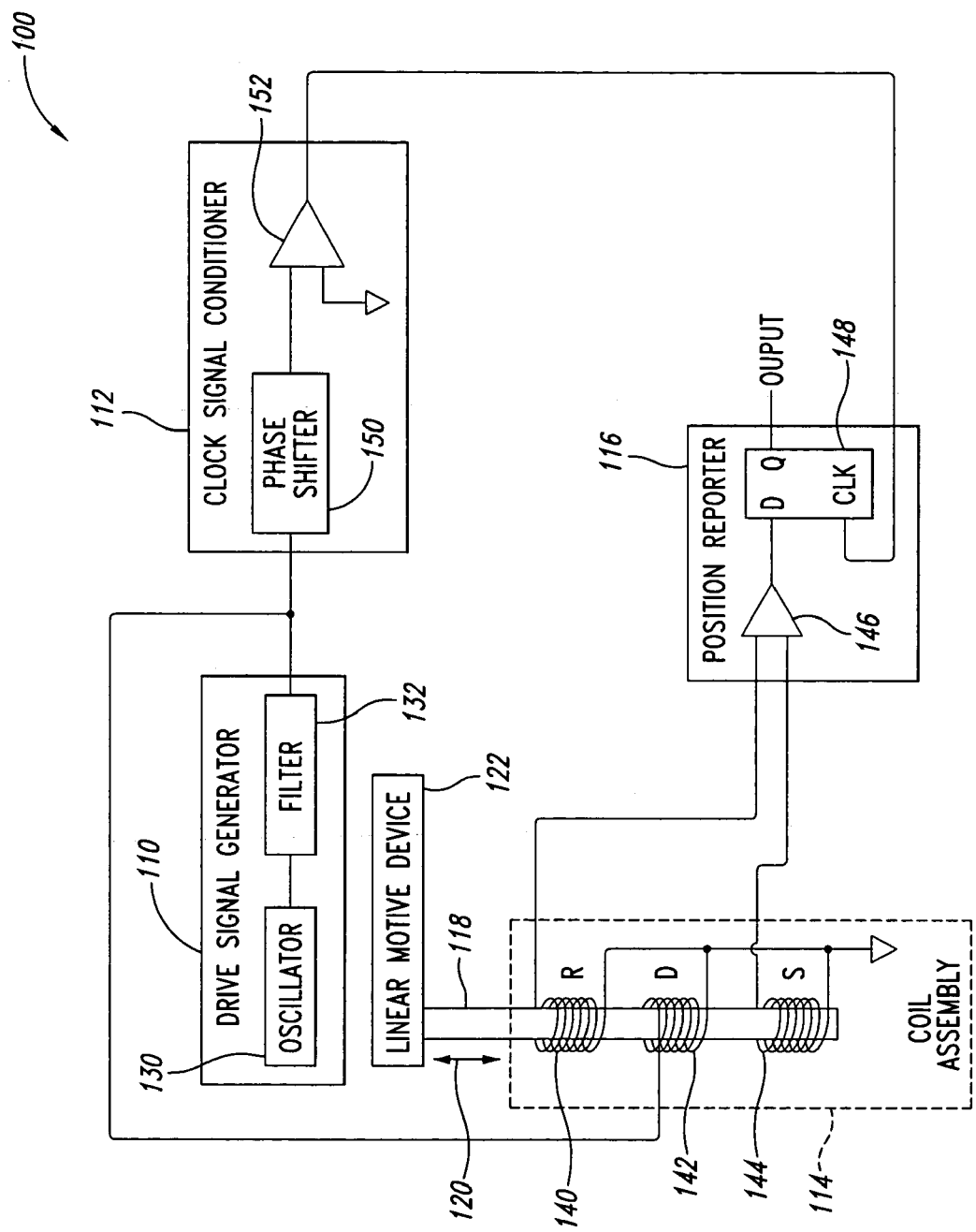
FIG. 1 is a schematic of an implementation of a displacement sensing system according to the present invention.

An implementation according to the present invention of a displacement sensing system 100 is shown in FIG. 1 as including a drive signal generator 110, a clock signal conditioner 112, a coil assembly 114, and a signal processor 116 for sensing one or more aspects (such as displacement, velocity, acceleration, jerk, phase, etc.) of a shaft 118 having an axis of bi-directional linear travel 120. In some implementations, the signal processor 116 could also be configured to control a process or system based upon the determination of the sensed aspect of the shaft 118. The shaft 118 is either part of or coupled to another shaft (not shown) of a linear motive device 122 such as a linear electro-dynamic machine as described above. As depicted, the coil assembly 114 and the linear motive device 122 are shown as separate structures, however, in other implementations, the coil assembly could be structurally integrated with the linear motive device.

In the depicted implementation, the drive signal generator 110 includes an oscillator 130 that generates a drive signal of periodic form such as a sine wave, a square wave, or other periodic form. Accuracy of the displacement sensing is generally not dependent upon the frequency of the periodic signal so such frequency can be conveniently chosen based upon available components. In the depicted implementation, the drive signal generator 110 further includes a filter 132 for further conditioning of the drive signal. Other implementations do not include the filter 132. The coil assembly 114 includes a reference coil 140 of wire, a drive coil 142 of wire, and a sense coil 144 of wire that share a common longitudinal axis being the axis of bi-directional linear travel 120 of the shaft 118. In the depicted implementation, the shaft 118 has a magnetic permeability relative to a vacuum typically greater than 10, such as greater than 20. Generally, the shaft 118 will be at least partially surrounded by a medium such as air, vacuum, oil, or other gas or liquid and the magnetic permeability of the shaft will be greater than the medium. The shaft 118 passes fully through the reference coil 140 and the drive coil 142 for a first degree of magnetic engagement with these coils. The shaft 118 also passes through the sense coil 144 to magnetically engage the sense coil in the depicted implementation less than or equal to the first degree of engagement of the shaft with the reference coil 140 and the drive coil 142. In other implementations the magnetic engagement of the sense coil may have other values.

The drive signal generator 110 is electrically coupled to a first end of the drive coil 142 with the second end of the drive coil coupled to ground such that the drive coil is energized when the drive signal is generated. This configuration of the drive signal generator 110 and the drive coil 142 produces a time varying magnetic flux to induce a time varying voltage across the reference coil 140 and the sense coil 144. As shown, the drive coil 142 is positioned between the reference coil 140 and the sense coil 144, which helps more evenly distribute the magnetic flux between the sense coil and the reference coil and minimizes potential interference between the coils. Voltage of the drive signal and voltages across the reference coil 140, the drive coil 142, and the sense coil 144 are the depicted parameters discussed herein, however, other implementations use other parameters such as current of the drive signal and currents through the reference coil, the drive coil and the sense coil.

In many of the implementations, the sense coil 144 has a number of turns of wire that is greater than the number turns of wire that the reference coil 140 has. In some implementations, the drive coil 142 has a number of turns of wire that is fairly comparable to the number of turns of wire of the sense coil 144. A null position exists related to travel of the shaft 118 such that when the shaft is at this null position, the time varying magnetic flux generated by the drive coil 142 will induce the same voltage difference across the reference coil 140 as across the sense coil 144. During calibration procedures, this null position for the shaft will be determined so that during operation, the null position is a predetermined position that can be used in part in determining current position of the shaft 118.

In other implementations, the number of turns of the reference coil 140, the drive coil 142, and the sense coil 144 can be different and the ordering of the coils can also be different. With these implementations, the ratio of amplitudes of the voltage (or other parameter) across the reference coil 140 and the sense coil 144 (such as a ratio of unity) at the point in which the shaft 118 reaches a predetermined position (such as the null position) is determined during a calibration period. Furthermore, the value for this ratio of voltage amplitudes corresponding to the predetermined position of the shaft 118 is repeatedly consistent over wide ranges of temperature since changes in magnetic coupling of the shaft with the reference coil 140 due to variations in temperature will be nearly identical to the corresponding changes in magnetic coupling of the shaft with the sense coil 144.

In the depicted implementation, the ratio of voltage amplitudes across the reference coil 140 and the sense coil 144 is approximately unity when the shaft 118 reaches the predetermined position (its null position). In other implementations, the ratio could be something other than unity. At any position of the shaft 118, the ratio of the voltages, along with the known null position, can be used to determine position of the shaft.

In order to compare the voltage across the reference coil 140 with the voltage across the sense coil 144, the two coils both have first ends coupled to inputs of a synchronous comparison circuit 146 of the signal processor 116 and both have second ends coupled to ground. As depicted, the output of the comparison circuit 146 is inputted to a D flip-flop 148, which is also part of the signal processor 116. The clock input (CLK) of the flip-flop 148 is coupled to the clock signal conditioner 112.

The clock signal conditioner 112 has a phase shifter 150, which is configured to delay the drive signal originating from the drive signal generator 110 by 90°. The clock signal conditioner 112 further has a synchronous comparison circuit 152 coupled to the phase shifter 150. The comparison circuit 152 is referenced to ground such that the comparison circuit squares the delayed signal outputted by the phase shifter 150. Consequently, for the depicted implementation, when the drive signal generator 110 generates a drive signal, the clock signal conditioner 112 properly clocks the flip-flop 148 so that the signal processor 116 outputs a logical "one" signal when the shaft 118 reaches its null position during travel of the shaft. It is anticipated that other implementations of the clock signal conditioner 112 could also be used.

Figure 2:
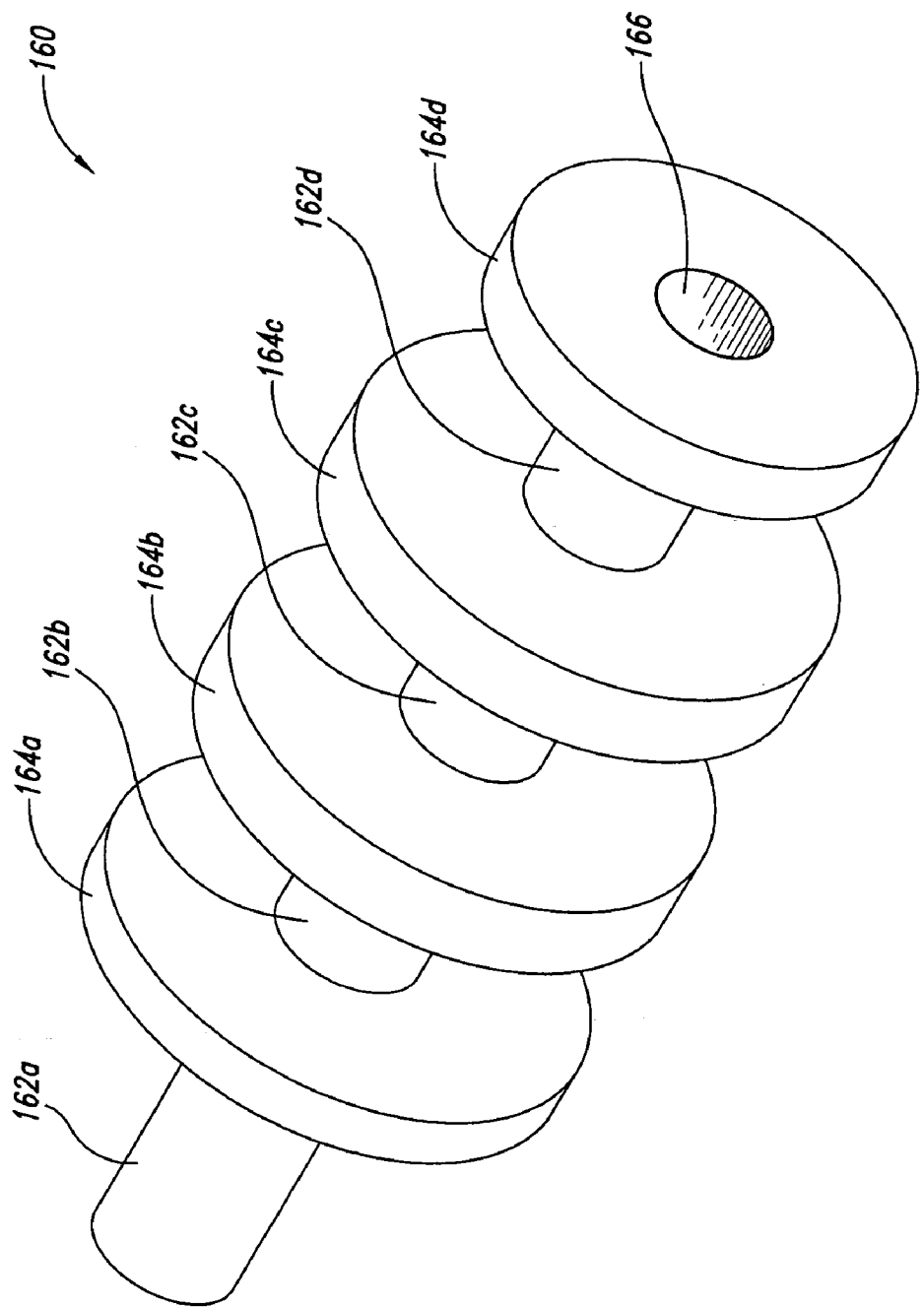
FIG. 2 is an isometric view of a cylinder assembly, which is part of a coil assembly of the implementation of the displacement sensing system of FIG. 1.

In the depicted implementation, the coil assembly 114 further includes a cylinder assembly 160. In this depicted implementation the cylinder assembly 160 has first, second, third, and fourth cylinder sections 162a–d, as shown in FIG. 2. In other implementations, the cylinder assembly 160 can be otherwise configured and is not limited to that shown in FIG. 2. The external surfaces of the cylinder sections 162a–d are partitioned by spaced-apart first, second, third, and fourth dividers 164a–d such that the external surfaces of the first and second cylinder sections 162a and 162b are partitioned by the first divider 164a, the external surfaces of second and third cylinder sections 162b and 162c are partitioned by the second divider 164b, the external surfaces of third and fourth cylinder sections 162c and 162d are partitioned by the third divider 164c, and the external surface of the fourth cylinder section 162d is also partitioned by the fourth divider 164d spaced apart from the third divider 164c.

The cylinder sections 162a–d share a common internal cylindrical volume having an opening 166 to receive the shaft 118 therein. In some implementations the cylinder sections 162a–d can be individual pieces joined together with the dividers 164a–c acting as flanges. In other implementations, the cylinder sections 162a–d can be part of a single cylinder where the dividers 164a–d are coupled along appropriate positions to the external surface of the single cylinder. For the depicted implementation, the reference coil 140 is wound around the external surface of the second cylinder section 162b, the drive coil 142 is wound around the external surface of the third cylinder section 162c, and the sense coil 144 is wound around the external surface of the fourth cylinder section 162d.

Figure 3:
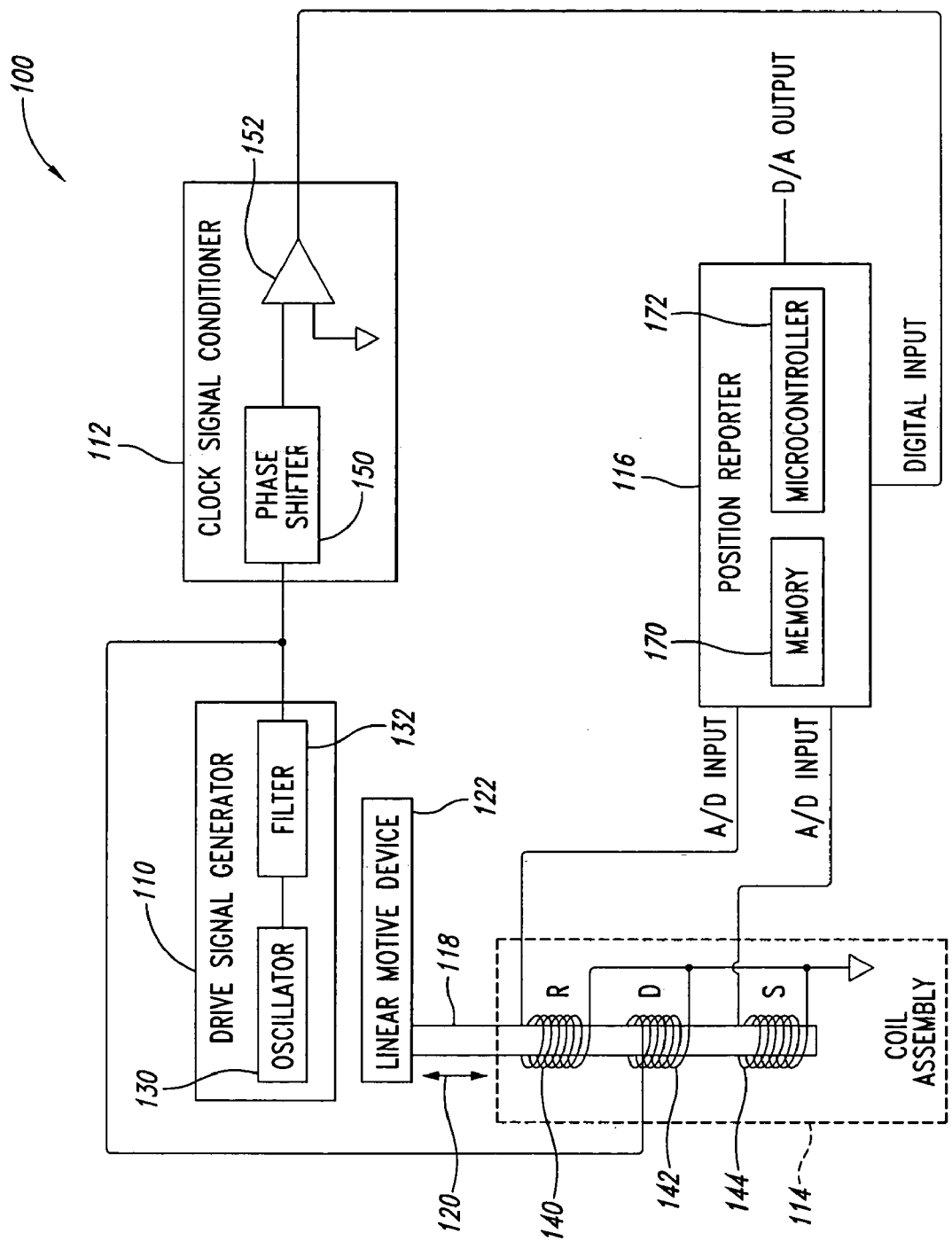
FIG. 3 is a schematic of an implementation of the displacement sensing system with a signal processor including a microcontroller.

In other implementations of the signal processor 116, the ratio of voltage across the sense coil 144 compared with the reference coil 140 is either measured for various positions of the shaft 118 by a microcontroller. The microcontroller 172, shown in FIG. 3, having analog to digital (A/D) inputs and a digital input, performs the measurements at the transition of the digital input, which is the synchronous clocking signal. The microcontroller can then calculate the ratio of voltage across the sense coil 144 compared with voltage across the reference coil 140 for any given position of the shaft 118. The microcontroller could then output the ratio calculation digitally or via a digital to analog (D/A) output thereby reporting position of the shaft 118 based upon the calculated ratio. The position report from the sensor can be further used to derive other parameters such as velocity, acceleration, jerk, phase, etc.

Figure 4:
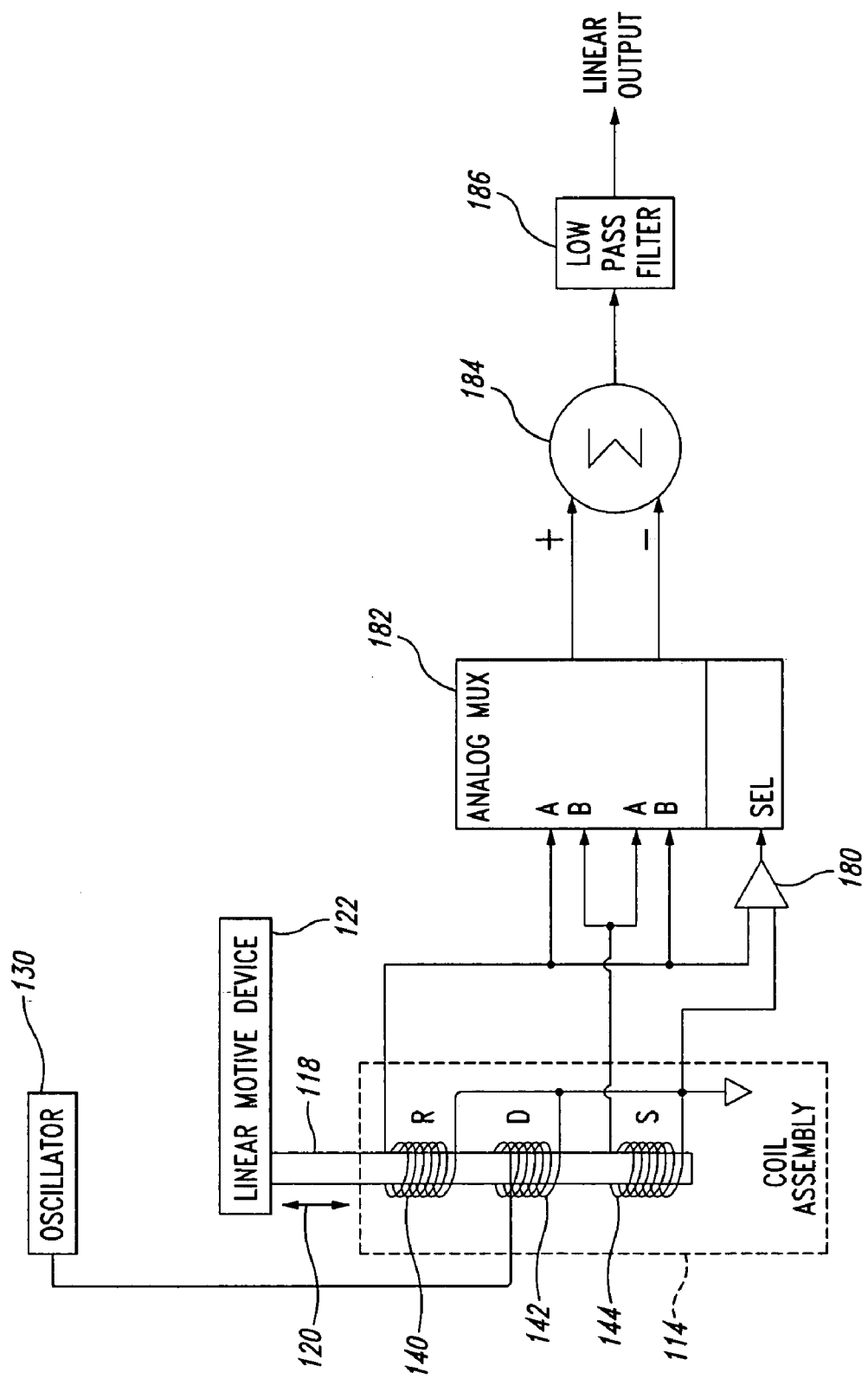
FIG. 4 is a schematic of an alternative implementation of the displacement sensing system with a multiplexer.

In another implementation shown in FIG. 4, the voltages from the reference coil 140 and the sense coil 144 are inputted to an analog multiplexer (MUX) 182 (such as a dual 2-to-1 multiplexer, multiple analog multiplexers, multiple analog switches, field effect transistors (FETs) used to effect analog switching, or other means), which is synchronously switched in phase with the voltage from the reference coil 142 by a synchronous comparison circuit 180. This achieves synchronous rectification of both signals. The outputs from the MUX 182 drive a difference amplifier 184 and filter 186, which produces an output voltage that is linear with stroke position.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system comprising:
   a shaft having magnetic permeability greater than that of a medium that at least partially surrounds the shaft, the shaft configured for bi-directional linear travel along a first axis;
   a drive signal generator including an oscillator configured to generate a drive signal having a periodically varying parameter;
   a drive coil having turns of wire, the drive coil electrically coupled to the drive signal generator to be energized by the drive signal generator to produce a time varying magnetic flux;
   a reference coil having turns of wire, the reference coil being in proximity of the drive coil for a first parameter to be induced in the reference coil by the magnetic flux;
   a sense coil having turns of wire having a longitudinal axis in line with the first axis such that at least a portion of the shaft passes into the sense coil to magnetically engage the sense coil during at least a portion of the bi-directional linear travel of the shaft, the sense coil being in proximity of the drive coil for a second parameter to be induced in the sense coil by the magnetic flux, the amplitude of the second parameter being influenced by how far the shaft has advanced into the sense coil, the ratio of magnitude of the second parameter to the first parameter being known for at least one position of advancement by the shaft into the sense coil during the bi-directional linear travel of the shaft; and
   a signal processor configured to compare the first parameter to the second parameter to identify when the shaft is at the at least one position of advancement.

2. The system of claim 1 wherein the parameter of the drive signal is a periodically varying voltage, the first parameter is a voltage across the reference coil, and the second parameter is a voltage across the sense coil.

3. The system of claim 1 further comprising an elongated member with a longitudinally extending bore therein, a cylinder having an internal volume, an external surface, and dividers protruding from the external surface, the reference coil, the drive coil, and the sense coil being wound around the external surface of the elongated member at longitudinally spaced apart positions and being separated from each other by the dividers, the shaft being reciprocally mounted in the bore and positioned at various degrees of advancement into the bore of the elongated member during the bi-directional linear travel of the shaft.

4. The system of claim 3 wherein the drive coil is positioned along the elongated member between the reference coil and the sense coil.

5. The system of claim 1 wherein the parameter of the drive signal generated by the drive signal generator periodically varies according to a one of the following functions: a square wave function and a sine wave function.

6. The system of claim 5 further comprising a clock signal conditioner electrically coupled to the drive signal generator to receive the drive signal, the clock signal conditioner including a phase shifter configured to output a shifted signal out of phase with the drive signal.

7. The system of claim 6 wherein the phase shifter of the clock signal conditioner is configured to output the shifted signal 90° out of phase with the drive signal and wherein the clock signal conditioner further comprises a first comparison circuit with inputs coupled to ground and to the phase shifter to receive the shifted signal, and wherein the signal processor includes a second comparison circuit and a flip-flop, the second comparison circuit with inputs coupled to the reference coil and the sense coil and an output coupled to an input of the flip-flop, the flip-flop having a clock input coupled to an output of the first comparison circuit.

8. The system of claim 1 further comprising an electrodynamic machine mechanically coupled to the shaft.

9. The system of claim 1 wherein the signal processor includes one of the following: a comparison circuit and a microcontroller.

10. The system of claim 1 wherein the turns of wire of the reference coil are wound around the first axis and the shaft passes through the entire reference coil along the first axis during all of the bi-directional linear travel of the shaft such that the shaft magnetically engages the reference coil to a degree independent of shaft position during the bi-directional linear travel of the shaft.

11. The system of claim 10 wherein the signal processor is configured to report the at least one position of advancement as a null position of the bidirectional travel of the shaft.

12. The system of claim 1 wherein the turns of wire of the drive coil extend around the first axis and the shaft passes through the entire drive coil along the first axis during all of the bi-directional linear travel of the shaft.

13. The system of claim 1 wherein the turns of wire of the reference coil extend around the first axis and the shaft passes through the entire reference coil along the first axis during all of the bi-directional linear travel of the shaft, and wherein the turns of wire of the drive coil extend around the first axis and the shaft passes through the entire drive coil along the first axis during all of the bi-directional linear travel of the shaft such that the shaft magnetically engages the reference coil to a degree independent from position of the shaft during the bi-directional linear travel of the shaft.

* * * * *